United States Patent
Watanabe et al.

(10) Patent No.: US 11,473,726 B2
(45) Date of Patent: Oct. 18, 2022

(54) LINER CONFIGURING MEMBER, HIGH PRESSURE TANK, AND METHOD OF MANUFACTURING SAME

(71) Applicant: HONDA MOTOR CO., LTD., Tokyo (JP)

(72) Inventors: Hideo Watanabe, Wako (JP); Takaharu Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 451 days.

(21) Appl. No.: 16/570,135

(22) Filed: Sep. 13, 2019

(65) Prior Publication Data

US 2020/0088351 A1    Mar. 19, 2020

(30) Foreign Application Priority Data

Sep. 14, 2018    (JP) .............................. JP2018-172376

(51) Int. Cl.
F17C 1/16    (2006.01)

(52) U.S. Cl.
CPC ........ *F17C 1/16* (2013.01); *F17C 2201/0109* (2013.01); *F17C 2203/0604* (2013.01); *F17C 2203/066* (2013.01); *F17C 2203/0614* (2013.01); *F17C 2205/0305* (2013.01); *F17C 2221/012* (2013.01); *F17C 2270/0184* (2013.01)

(58) Field of Classification Search
CPC ................ F17C 1/16; F17C 2201/0109; F17C 2203/0604; F17C 2203/0614; F17C 2203/066; F17C 2205/0305
USPC ...................................... 220/581, 4.13, 4.26
See application file for complete search history.

(56) References Cited

U.S. PATENT DOCUMENTS

| | | | | |
|---|---|---|---|---|
| 3,454,179 A | * | 7/1969 | Kerr | B29C 66/636 220/613 |
| 4,779,757 A | * | 10/1988 | Fuckert | F17C 1/10 220/4.12 |
| 7,918,956 B2 | * | 4/2011 | Mehta | F17C 1/00 220/586 |
| 2004/0238536 A1 | * | 12/2004 | Volkmann | B65G 53/60 220/4.26 |

(Continued)

FOREIGN PATENT DOCUMENTS

| | | |
|---|---|---|
| JP | 2006-153176 A | 6/2006 |
| JP | 2013-119924 A | 6/2013 |

OTHER PUBLICATIONS

Office Action dated May 26, 2020 issued over the corresponding Japanese Patent Application No. 2018-172376 with the English translation thereof.

*Primary Examiner* — J. Gregory Pickett
*Assistant Examiner* — Niki M Eloshway
(74) *Attorney, Agent, or Firm* — Carrier Blackman and Associates, P.C.; Joseph P. Carrier; Jeffrey T. Gedeon

(57) ABSTRACT

A liner configuring member configuring a liner includes a main body section which is configured from a resin material and has both ends opened. That is, both ends of the main body section are, respectively, a first open end and a second open end. There is provided in a vicinity of the first open end a first flange section where a first annular recess is formed by a first bottom section and a first side section. On the other hand, there is provided in a vicinity of the second open end a second flange section where a second annular recess is formed by a second bottom section and a second side section.

11 Claims, 10 Drawing Sheets

(56) References Cited

U.S. PATENT DOCUMENTS

| | | | |
|---|---|---|---|
| 2011/0220659 A1* | 9/2011 | Strack | F17C 1/16 |
| | | | 220/586 |
| 2017/0261158 A1* | 9/2017 | Cogliati | F16J 12/00 |
| 2018/0180221 A1* | 6/2018 | Mallick | F17C 1/06 |
| 2019/0242525 A1* | 8/2019 | Criel | B32B 27/08 |
| 2020/0332960 A1* | 10/2020 | Sato | B29C 66/1142 |

* cited by examiner

LINER CONFIGURING MEMBER, HIGH PRESSURE TANK, AND METHOD OF MANUFACTURING SAME

CROSS-REFERENCE TO RELATED APPLICATION

This application is based upon and claims the benefit of priority from Japanese Patent Application No. 2018-172376 filed on Sep. 14, 2018, the contents of which are incorporated herein by reference.

BACKGROUND OF THE INVENTION

Field of the Invention

The present invention relates to a liner configuring member that configures a high pressure tank for storing a high pressure gas, relates to a high pressure tank which has a liner that includes the liner configuring member, and relates to a method of manufacturing the high pressure tank.

Description of the Related Art

A high pressure tank is provided in a vehicle-installed fuel cell system and stores a hydrogen gas to be supplied to an anode, for example. This type of high pressure tank has a resin liner which is configured from the likes of a thermoplastic resin material having hydrogen barrier properties. Conventionally, the resin liner is manufactured by liner configuring members of substantially the same shape being joined to each other.

More specifically, the liner configuring member is configured from a semi-cylindrically-shaped body whose one end is an open end and whose other end is a blocking end curved so as to gradually converge. Moreover, as described in Japanese Laid-Open Patent Publication No. 2013-119924, end surfaces of the open ends are matched up (abutted on each other), and in this state, the end surfaces are joined. As a result, the resin liner is obtained.

Next, a cap is provided to the blocking end of the resin liner, and moreover, a reinforced layer configured from a fiber-reinforced resin (FRP) that is reinforced-fibers impregnated with a resin base material, is provided so as to cover part of the cap and the resin liner. In this way, the high pressure tank is obtained.

SUMMARY OF THE INVENTION

When the fuel cell system is installed in a large vehicle such as a truck or bus, the high pressure tank is assumed to be configured as a long one, matching a vehicle length. Now, the liner configuring member is generally manufactured by injection molding. In the case of obtaining a large and long resin product, if an injection molding apparatus of small injection power is employed, then it becomes difficult for a molten resin to be made to reach to corner sections of a molding cavity of the mold, and there is a possibility of a filling defect (a so-called short) occurring in a flow length tip. Moreover, even if a short is not reached, it becomes difficult to obtain a liner configuring member having good dimensional accuracy, that is, good flatness, of its welding region, due to there not being obtained sufficient filling density in the flow length tip. Therefore, an enormous and expensive injection molding apparatus of extremely large maximum injection power becomes required. Moreover, highly precisely manufacturing a mold for forming a long cavity leads to a rise in costs.

Accordingly, it is recalled that trunk sections of the resin liner are connected by aligning a plurality of cylindrically shaped liner configuring members on the same axis. In this case, although open ends of the liner configuring members are joined by being abutted on each other, the open ends are thin, so, even though a contribution is made to lightening weight, it is not easy for a sufficient joining force to be given to an abutting place.

A main object of the present invention is to provide a liner configuring member by which a high pressure tank whose joining section shows excellent joining strength and that is sufficiently reliable, is obtained.

Another object of the present invention is to provide a high pressure tank that includes the above-described liner configuring member.

Yet another object of the present invention is to provide a method of manufacturing a high pressure tank that obtains the high pressure tank from the above-described liner configuring member.

In order to achieve the previously described objects, an aspect of the present invention provides a liner configuring member that includes a main body section having a cylindrical shape which is configured from a resin material and whose both ends are opened to be formed as a first open end and a second open end, a plurality of the liner configuring members being connected on the same axis to configure a trunk section of a high pressure tank-dedicated liner, there being included in a vicinity of the first open end: a first bottom section that projects outwardly in a radial direction; and a first side section that is continuous with the first bottom section and extends so as to separate from the first open end, and there being provided in the vicinity of the first open end a first flange section where a first annular recess is formed by the first bottom section and the first side section, and there being included in a vicinity of the second open end: a second bottom section that projects inwardly in the radial direction; and a second side section that is continuous with the second bottom section and extends so as to separate from the second open end, and there being provided in the vicinity of the second open end a second flange section where a second annular recess is formed by the second bottom section and the second side section.

Another aspect of the present invention provides a high pressure tank having a liner, the liner including: a trunk section configured from a resin material and having a cylindrical shape; and a first blocking section and a second blocking section that are continuous with the trunk section and whose end sections are blocking ends, a projection projecting inwardly in the radial direction being provided on an inner surface of the trunk section.

Yet another aspect of the present invention provides a method of manufacturing a high pressure tank, the high pressure tank having a liner, the liner including: a trunk section configured from a resin material and having a cylindrical shape; and a first blocking section and a second blocking section that are continuous with the trunk section and whose end sections are blocking ends, the method of manufacturing the high pressure tank being:

when obtaining the trunk section by connecting on the same axis a plurality of liner configuring members each having both ends opened to be formed as a first open end and a second open end, using, as the liner configuring member, a member in which there is included in a vicinity of the first open end: a first bottom section that projects outwardly in a radial direction; and a first side section that is continuous with the first bottom section and extends so as to separate from the first open end, and there is provided in the vicinity of the first open end a first flange section where a first annular recess is formed by the first bottom section and the first side section, and there is included in a vicinity of the second open end: a second bottom section that projects inwardly in the radial direction; and a second side section that is continuous with the second bottom section and extends so as to separate from the second open end, and there is provided in the vicinity of the second open end a second flange section where a second annular recess is formed by the second bottom section and the second side section, and joining first bottom sections of the first flange sections, or second bottom sections of the second flange sections.

Due to the present invention, a configuration is adopted whereby the first open end and the second open end of the cylindrically shaped liner configuring member are respectively provided with the first flange section and the second flange section. When ones of these first flange sections or ones of these second flange sections are abutted on each other, an abutting area increases, so a large pressing force can be applied. Therefore, a joining section having excellent joining strength is obtained.

Moreover, since the liner is obtained by joining a plurality of the liner configuring members, the individual liner configuring members can be manufactured as comparatively short liner configuring members. In this case, since the molten resin is filled to the corner sections of the molding cavity during injection molding, a liner configuring member having excellent dimensional accuracy is obtained. When such liner configuring members are joined, there is no concern that micro-pores due to a joining defect will be formed between the liner configuring members.

The above matters combine, whereby there is obtained a high pressure tank that excels in pressure tightness and in which leakage is prevented. Moreover, by sequentially aligning (joining) a plurality of the liner configuring members along a longitudinal direction, a large and long high pressure tank can be easily obtained.

In addition, by configuring the shape of the liner configuring member as described above, the mold of the injection molding apparatus can be opened along the longitudinal direction of the liner configuring member. That is, it becomes possible for the liner configuring member to be obtained by injection molding.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 10 is a principal part enlarged cross-sectional view showing a vicinity of a first flange section that is provided in a liner configuring member whose inner diameter and outer diameter have uniform diameters, and that has a side section inclined so as to separate from an outer wall of a main body section as a first bottom section is separated from.

DESCRIPTION OF THE PREFERRED EMBODIMENTS

Preferred embodiments of a high pressure tank and a method of manufacturing the same according to the present invention will be presented and described in detail below with reference to the accompanying drawings, in relation to a liner configuring member for obtaining the high pressure tank. Note that a "cylindrical body" below includes both a cylindrical body whose inner diameter and outer diameter have uniform diameters, and a cylindrical body whose inner diameter or outer diameter undergoes diameter reduction or diameter expansion in a tapered manner in a direction from one end toward another end.

Figure 1:
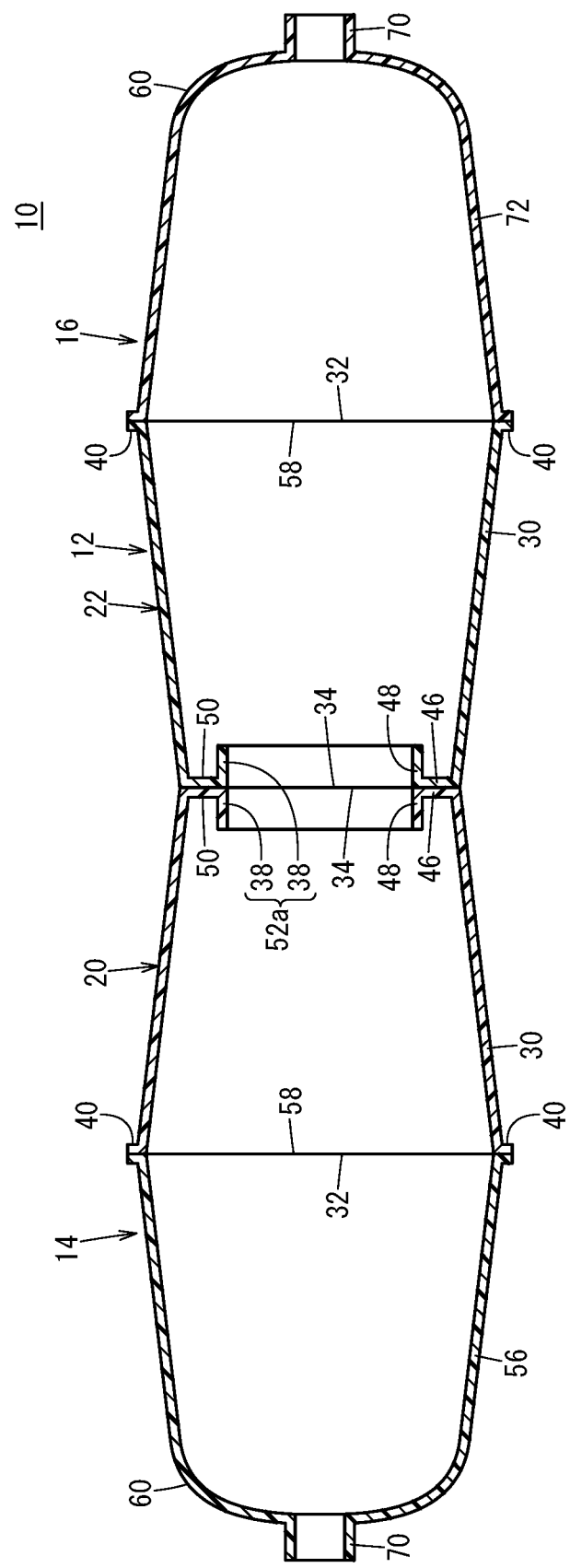
FIG. 1 is a schematic side cross-sectional view of a resin liner configuring a high pressure tank according to a first embodiment of the present invention.

FIG. 1 is a schematic side cross-sectional view of a resin liner (hereafter, written also simply as "liner") 10 configuring a high pressure tank according to a first embodiment. This liner 10 includes: a trunk section 12; and a first blocking section 14 and a second blocking section 16 that block both ends of the trunk section 12.

The trunk section 12 is configured by a first trunk section configuring member 20 and a second trunk section configuring member 22 being joined. Although the first trunk section configuring member 20 and the second trunk section configuring member 22 are liner configuring members having substantially the same shape as each other, in order to clearly distinguish members 20, 22 from each other, different reference symbols are assigned to the members 20, 22.

Figure 2:
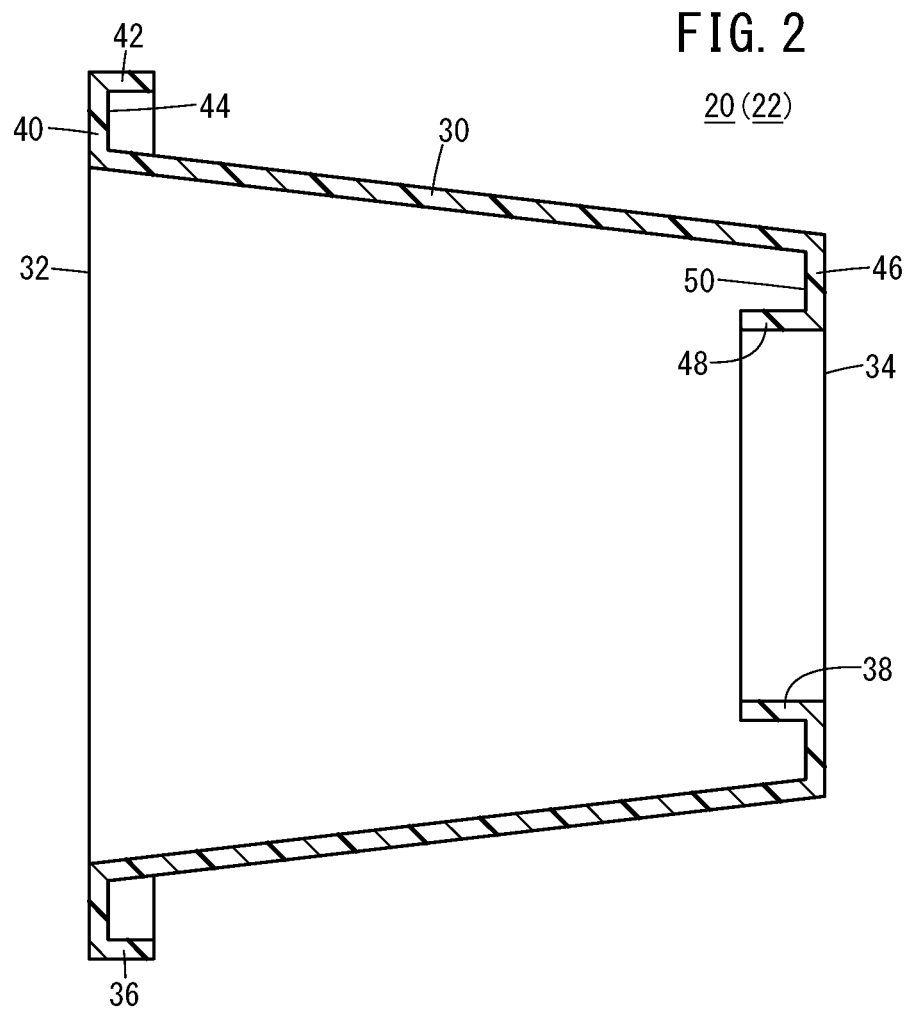
FIG. 2 is a schematic side cross-sectional view of a liner configuring member configuring the resin liner of FIG. 1.

First, the first trunk section configuring member 20 and the second trunk section configuring member 22 will be described. FIG. 2 is a schematic side cross-sectional view of the first trunk section configuring member 20 before joining. The first trunk section configuring member 20 is a tapered cylindrical body in which both ends of a main body section 30 are opened to respectively form a first open end 32 and a second open end 34, and whose inner diameter and outer diameter undergo diameter reduction in a tapered manner in a direction from the first open end 32 toward the second open end 34. Moreover, a first flange section 36 projecting and being oriented outwardly in a diametric direction is formed in a vicinity of the first open end 32, while a second flange section 38 projecting and being oriented inwardly in the diametric direction is formed in a vicinity of the second open end 34.

The first flange section 36 includes: a first bottom section 40 that projects outwardly in the diametric direction; and an annular first side section 42 that extends from the first bottom section 40 bent so as to head toward a second open end 34 side (so as to separate from the first open end 32). A first annular recess 44 is defined by these first bottom section 40 and first side section 42. That is, the first annular recess 44 is a space formed between the main body section 30 and the first side section 42 of the first flange section 36. The first annular recess 44 sinks being oriented from the second open end 34 toward the first open end 32.

Whereas a side wall of the main body section 30 inclines in a tapered manner, the first side section 42 extends along a horizontal direction. Therefore, the first side section 42 inclines, as the distance from the first bottom section 40 increases, so as to separate toward an outer side in the diametric direction relative to the side wall of the main body section 30.

On the other hand, the second flange section 38 includes: a second bottom section 46 that projects inwardly in the diametric direction; and an annular second side section 48 that extends from the second bottom section 46 and bends so as to head toward a first open end 32 side (so as to separate from the second open end 34). A second annular recess 50 is defined by the second bottom section 46 and second side section 48 as a space formed between the side wall of the main body section 30 and the second side section 48 of the second flange section 38. The second annular recess 50 sinks being oriented from the first open end 32 toward the second open end 34.

The second side section 48 extends along the horizontal direction. Therefore, the second side section 48 inclines, as the distance from the second bottom section 46 increases, so as to separate toward an inner side in the diametric direction relative to the side wall of the main body section 30.

The second trunk section configuring member 22 is configured correspondingly to the first trunk section configuring member 20, as described above. Hence, configuring elements that are the same as configuring elements of the first trunk section configuring member 20 will be assigned with the same reference symbols as those of the first trunk section configuring member 20, and detailed descriptions thereof will be omitted. Note that as may be understood from FIG. 1, the first trunk section configuring member 20 and the second trunk section configuring member 22 are joined in such a manner that second flange sections 38, 38 of each of the members face each other. Therefore, the trunk section 12 of the liner 10 undergoes diameter expansion in a tapered manner toward a first blocking section 14 side and a second blocking section 16 side.

One annular projection 52a projects inwardly in the diametric direction in a region corresponding to a joining place of the first trunk section configuring member 20 and the second trunk section configuring member 22, on an inner surface of the trunk section 12 (refer to FIG. 1). As will be mentioned later, the annular projection 52a is a projection formed by second flange sections 38, 38 of the first trunk section configuring member 20 and the second trunk section configuring member 22 being joined. Hence, the annular projection 52a includes: a bottom section configured by second bottom sections 46, 46 being joined; a first blocking section side peripheral wall section configured by the second side section 48 of the first trunk section configuring member 20 and extending toward the first blocking section 14; and a second blocking section side peripheral wall section config-ured by the second side section 48 of the second trunk section configuring member 22 and extending toward the second blocking section 16.

In the annular projection 52a, the second annular recess 50 as an annular recess is defined by the bottom section and the first blocking section side peripheral wall section (the second side section 48 of the first trunk section configuring member 20), and the second annular recess 50 as another annular recess is defined by the bottom section and the second blocking section side peripheral wall section (the second side section 48 of the second trunk section configuring member 22). Second annular recesses 50, 50 are in a relationship of being positioned on each other's back surface.

The first blocking section 14 is provided on a first open end 32 side of the first trunk section configuring member 20, and the second blocking section 16 is provided on a first open end 32 side of the second trunk section configuring member 22. Next, the first blocking section 14 and second blocking section 16 will be described.

Figure 3:
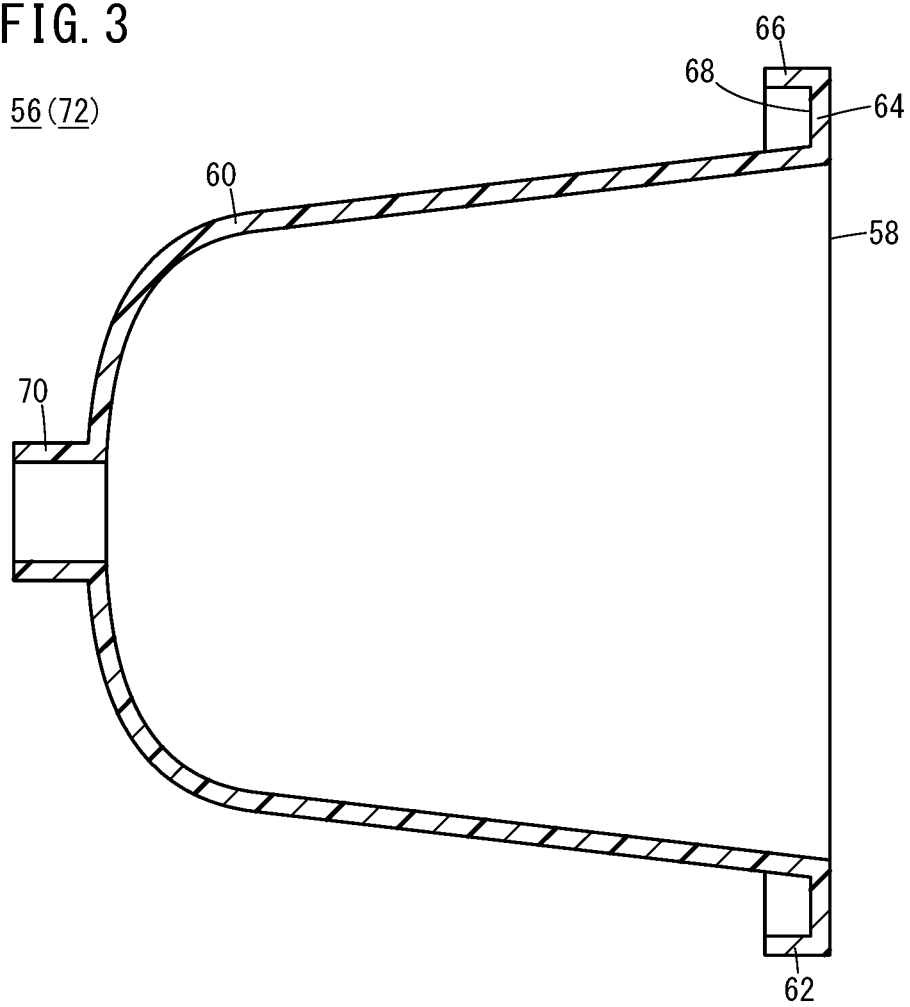
FIG. 3 is a schematic side cross-sectional view of a blocking member configuring the resin liner or FIG. 1.

The first blocking section 14 is configured by a single first blocking member 56 shown in FIG. 3. One end of the first blocking member 56 is a third open end 58 that is open, and the other end of the first blocking member 56 is a blocking end 60 that converges in a dome shape. The first blocking member 56 undergoes diameter reduction in a tapered manner from the third open end 58 toward the blocking end 60.

Moreover, a third flange section 62 projecting outwardly in the diametric direction is provided in a vicinity of the third open end 58. That is, the third flange section 62 includes: a third bottom section 64 that projects outwardly in the diametric direction; and an annular third side section 66 that extends from the third bottom section 64 and bends so as to head toward a blocking end 60 side (so as to separate from the third open end 58). A third annular recess 68 is defined by these third bottom section 64 and third side section 66. The third annular recess 68 sinks being oriented from a blocking end 60 side toward a third open end 58 side.

A top surface of the blocking end 60 is provided with a boss section 70 that extends projecting to a side further from the third open end 58.

The second blocking section 16 is configured by a single second blocking member 72. The second blocking member 72 is configured similarly to the first blocking member 56, hence the same configuring elements will be assigned with the same reference symbols, and descriptions thereof will be omitted.

Next, a method of manufacturing the high pressure tank by going through a process that obtains the liner 10 shown in FIG. 1 from the first trunk section configuring member 20, the second trunk section configuring member 22, the first blocking member 56, and the second blocking member 72 configured as above will be described.

The first trunk section configuring member 20 and the second trunk section configuring member 22 are manufactured by, for example, performing injection molding using a molten resin material with an unillustrated injection molding apparatus. In addition, the first blocking member 56 and the second blocking member 72 can be manufactured with the same injection molding apparatus using a different mold from the mold for obtaining the first trunk section configuring member 20 and the second trunk section configuring member 22. Of course, a different injection molding apparatus may be used.

The likes of high density polyethylene (HDPE) resin that has hydrogen barrier properties and is a thermoplastic resin, may be cited as a suitable example of the resin material.

Note that the first flange section 36 and the second flange section 38 are of course integrally molded with the main body section 30.

The first trunk section configuring member 20 and the second trunk section configuring member 22 have the same shape as each other, so can be manufactured by the same mold. The first blocking member 56 and the second blocking member 72 also have the same shape as each other, hence can be manufactured by the same mold. As a result, there is no need to manufacture a plurality of molds for obtaining the trunk section 12 and molds for obtaining the blocking sections, so mold costs can be lowered.

Moreover, in this case, the members 20, 22, 56, 72 configuring the liner 10 can each be manufactured as a short member. Hence, in the injection molding, it is easy for the molten resin to be made to reach to corner sections of the molding cavity of the mold, and, as a result, members 20, 22, 56, 72 having good dimensional accuracy can be obtained.

Next, the first trunk section configuring member 20 and the second trunk section configuring member 22 are joined. Hereafter, vibration welding is taken as an example. In this case, the second open end 34 of the first trunk section configuring member 20 and the second open end 34 of the second trunk section configuring member 22 are faced each other a certain distance apart.

Figure 4:
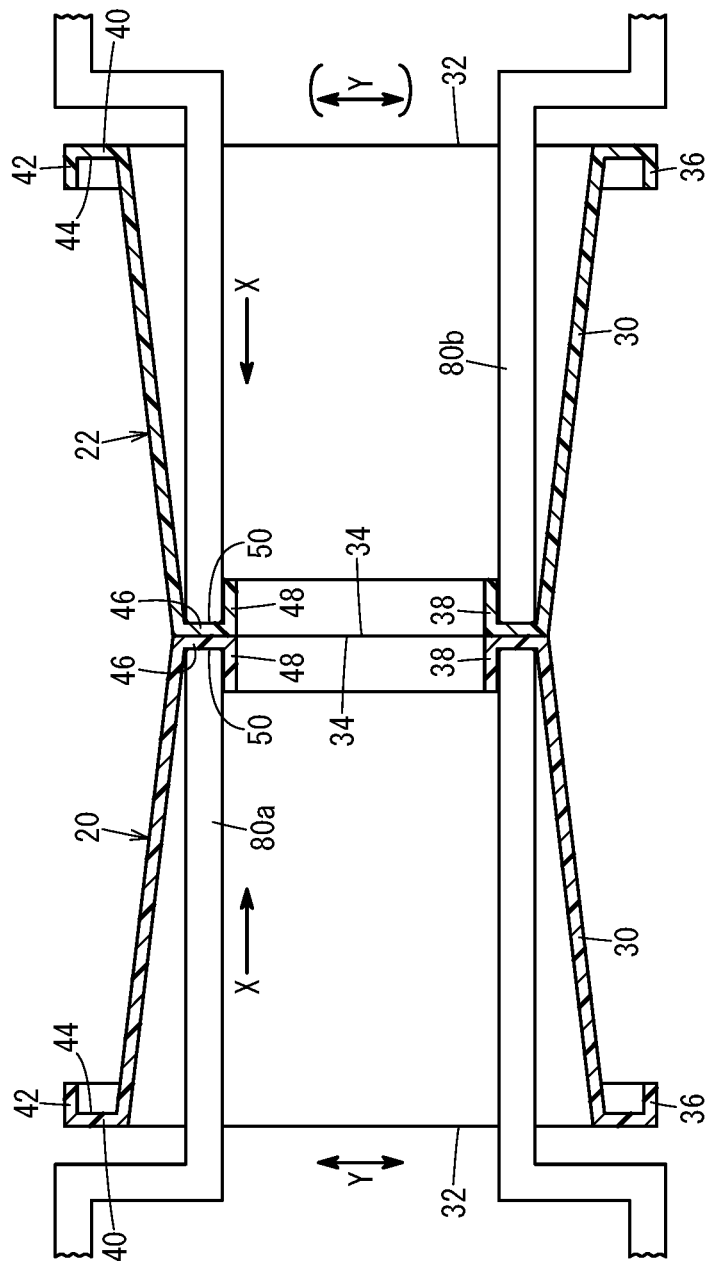
FIG. 4 is a schematic side cross-sectional view showing a state where fellow liner configuring members are joined in order to obtain a trunk section configuring the resin liner.

Next, as shown in FIG. 4, a vibration welding-dedicated jig 80a is advanced from the first open end 32 of the first trunk section configuring member 20, and inserted in the second annular recess 50 of the first trunk section configuring member 20. Similarly, a vibration welding-dedicated jig 80b is advanced from the first open end 32 of the second trunk section configuring member 22, and inserted in the second annular recess 50 of the second trunk section configuring member 22. Note that the vibration welding-dedicated jigs 80a, 80b may also function as jigs in the case of performing welding by heating.

In this state, the vibration welding-dedicated jigs 80a, 80b are displaced whereby each of the second flange sections 38 of the first trunk section configuring member 20 and the second trunk section configuring member 22 is pressed in an arrow X direction. As a result, the first trunk section configuring member 20 and the second trunk section configuring member 22 approach each other, and fellow second open ends 34 abut on each other (are matched up). That is, an abutting step is performed, and an abutting region is formed. Note that the vibration welding-dedicated jigs 80a, 80b have their tip sides bent inwardly. FIG. 4 shows this bending exaggeratedly.

Next, a joining step is performed. That is, as shown by the arrow Y in FIG. 4, the vibration welding-dedicated jig 80a is vibrated along the diametric direction of the first trunk section configuring member 20, for example. Consequently, frictional heat occurs in the abutting region, and, as a result, the abutting region softens or melts. Since the vibration welding-dedicated jigs 80a, 80b in the second annular recesses 50 are pressing in a direction that the first trunk section configuring member 20 and the second trunk section configuring member 22 approach each other, the softened or melted resin material leaks out to an inner peripheral wall side or an outer peripheral wall side.

Note that a configuration may be adopted whereby the vibration welding-dedicated jig 80b is vibrated along the diametric direction of the second trunk section configuring member 22. Moreover, provided it is possible for the vibration welding-dedicated jigs 80a, 80b to be vibrated or rotated in a circumferential direction of the first trunk section configuring member 20 and the second trunk section configuring member 22, a configuration that does so may be adopted.

After a certain time has elapsed, vibration imparting is stopped and the vibration welding-dedicated jigs 80a, 80b are displaced and withdrawn from the second annular recesses 50. Since a side wall (an inner wall) of the main body section 30 separates relatively from the second side section 48 as the side wall comes close to the first open end 32 side, the vibration welding-dedicated jigs 80a, 80b can be easily withdrawn from the second annular recesses 50 at this time. Moreover, by the softened or melted resin material being cooled and thereby solidifying, the second flange sections 38, 38 of the first trunk section configuring member 20 and the second trunk section configuring member 22 are joined.

The second flange sections 38 are joined by the fellow second bottom sections 46, 46 abutting on each other. Due to this joining, the annular projection 52a including the bottom section that projects inwardly in the diametric direction is formed on the inner surface of the trunk section 12. Since each of the second flange sections 38 has the second side section 48, the first blocking section side peripheral wall section is configured by the second side section 48 of the first trunk section configuring member 20, and the second blocking section side peripheral wall section is configured by the second side section 48 of the second trunk section configuring member 22. The first blocking section side peripheral wall section extends toward the first blocking section 14, while the second blocking section side peripheral wall section extends toward the second blocking section 16.

Figure 5:
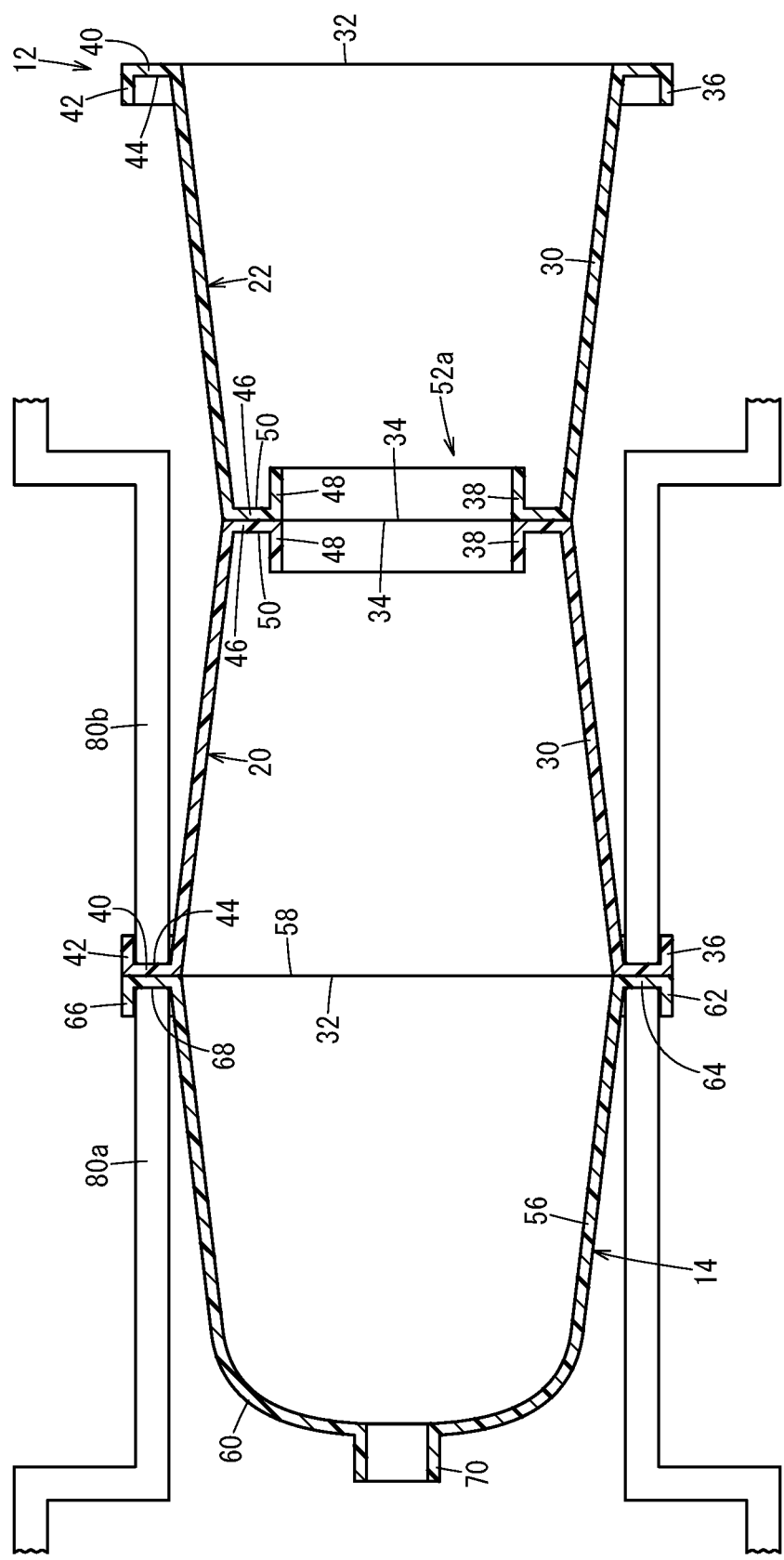
FIG. 5 is a schematic side cross-sectional view showing a state where the blocking member is joined to one of open ends of the trunk section, following FIG. 4.

Next, the first blocking member 56 is joined to the first trunk section configuring member 20. At this time, the first open end 32 of the first trunk section configuring member 20 and the third open end 58 of the first blocking member 56 are faced on to each other a certain distance apart. Then, as shown in FIG. 5, the vibration welding-dedicated jig 80a is inserted in the third annular recess 68 of the first blocking member 56, while the vibration welding-dedicated jig 80b is inserted in the first annular recess 44 of the first trunk section configuring member 20. Alternatively, a configuration may be adopted whereby the vibration welding-dedicated jig 80a is inserted in the first annular recess 44 of the first trunk section configuring member 20, while the vibration welding-dedicated jig 80b is inserted in the third annular recess 68 of the first blocking member 56. Since the vibration welding-dedicated jig 80b is bent, it is avoided that the vibration welding-dedicated jig 80b interferes with the second trunk section configuring member 22.

Note that a different one from the vibration welding-dedicated jigs 80a, 80b for joining the first trunk section configuring member 20 and the second trunk section configuring member 22 may be used as a vibration welding-dedicated jig for joining the first trunk section configuring member 20 and the first blocking member 56. Although this applies similarly also in a later-mentioned second embodiment, hereafter, description will be made exemplifying the case where the same vibration welding-dedicated jigs 80a, 80b are used.

Vibration welding is performed hereafter similarly to the one described above. That is, the vibration welding-dedicated jigs 80a, 80b are displaced whereby the third flange section 62 of the first blocking member 56 and the first flange section 36 of the first trunk section configuring member 20 are pressed in a direction of approaching each other. As a result, the third open end 58 of the first blocking member 56 and the first open end 32 of the first trunk section configuring member 20 abut on each other whereby an abutting region is formed. Then, at least one of the vibration welding-dedicated jigs 80*a*, 80*b* is vibrated along the diametric direction of the first blocking member 56 or the first trunk section configuring member 20.

Due to frictional heat caused by this vibration, the abutting region softens or melts. After a certain time has elapsed, vibration imparting is stopped and the vibration welding-dedicated jigs 80*a*, 80*b* are displaced and respectively withdrawn from the third annular recess 68 and the first annular recess 44. Now, in the first trunk section configuring member 20, the side wall (the inner wall) of the main body section 30 separates relatively from the first side section 42 as the side wall comes close to the second open end 34 side. The third side section 66 of the first blocking member 56 also similarly separates relatively from a side wall of the first blocking member 56 as the third side section 66 comes close to a blocking end 60 side. It hence becomes easy for the vibration welding-dedicated jigs 80*a*, 80*b* to be withdrawn from the third annular recess 68 and the first annular recess 44.

Then, by the softened or melted resin material being cooled and thereby solidifying, the first blocking member 56 and the first trunk section configuring member 20 are joined, and the first blocking section 14 is obtained.

Figure 6:
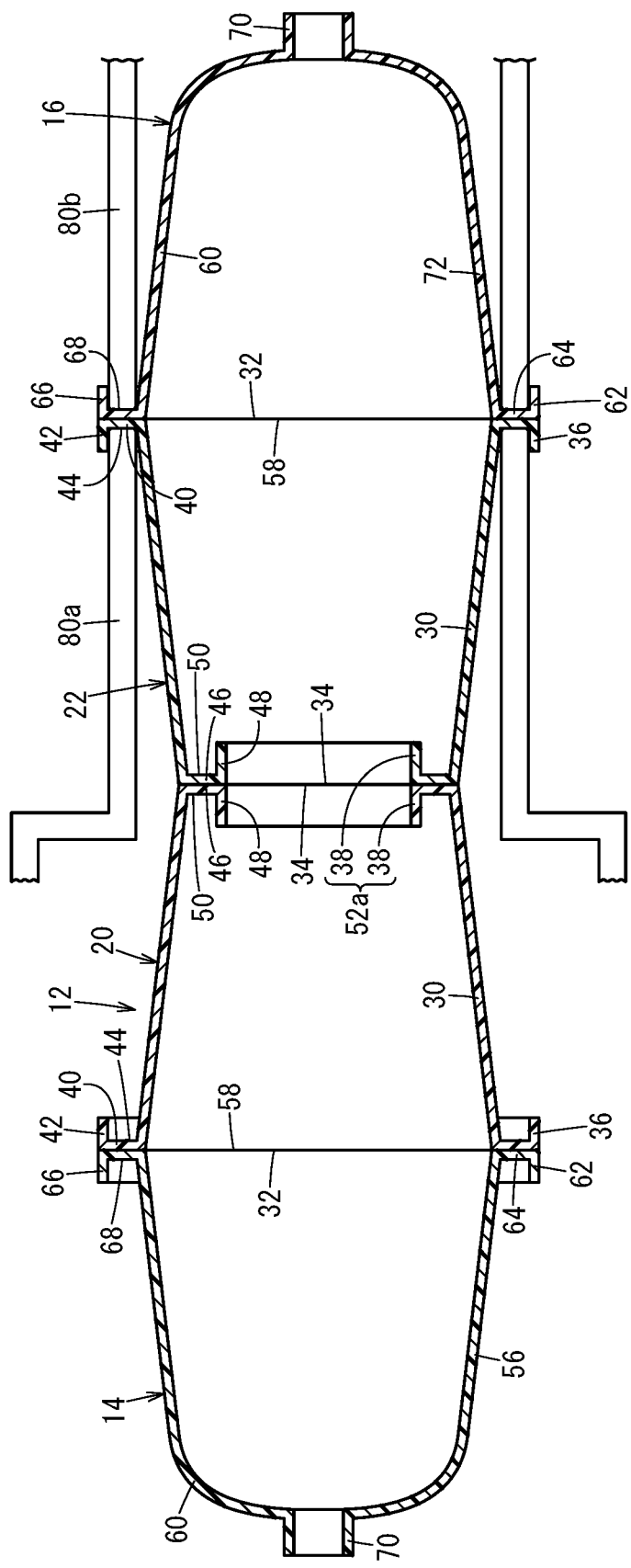
FIG. 6 is a schematic side cross-sectional view showing a state where the blocking member is joined to a remaining one of the open ends of the trunk section, following FIG. 5.

Next, as shown in FIG. 6, the second blocking member 72 is joined to the second trunk section configuring member 22. That is, the first open end 32 of the second trunk section configuring member 22 and the third open end 58 of the second blocking member 72 are faced on to each other so as to be separated by a certain distance. Then, as the above, the vibration welding-dedicated jig 80*a* is inserted in the first annular recess 44 of the first trunk section configuring member 20, while the vibration welding-dedicated jig 80*b* is inserted in the third annular recess 68 of the second blocking member 72, after which vibration welding is performed. Note that a configuration may be adopted whereby the vibration welding-dedicated jig 80*a* is inserted in the third annular recess 68 of the second blocking member 72, while the vibration welding-dedicated jig 80*b* is inserted in the first annular recess 44 of the first trunk section configuring member 20.

After a certain time has elapsed, vibration imparting is stopped and the vibration welding-dedicated jigs 80*a*, 80*b* are displaced and respectively withdrawn from the first annular recess 44 and the third annular recess 68. For the above-described reasons, it is easy for the vibration welding-dedicated jigs 80*a*, 80*b* to be withdrawn from the first annular recess 44 and the third annular recess 68.

Then, by the softened or melted resin material being cooled and thereby solidifying, the second blocking member 72 and the second trunk section configuring member 22 are joined, and the second blocking section 16 is obtained.

Next, a cutting step in which the two items of the mutually-adhered first flange section 36 and third flange section 62 are both cut, is performed. Although a configuration may be adopted whereby all of the first flange section 36 and the third flange section 62 are removed, a configuration may be adopted whereby some of the first bottom section 40 and the third bottom section 64 remain. This is because in this case, an area of a joining surface of the first open end 32 and the third open end 58 increases, and joining strength proportionately increases. However, if a residual projection amount (a level difference with the side wall of the main body section 30) is excessively large, then when a reinforced layer is formed, a stress acts on the reinforced layer due to the remaining first bottom section 40 and third bottom section 64 catching on the reinforced layer. In order to avoid this, the residual projection amount of the first bottom section 40 and the third bottom section 64 is preferably set to not exceed a level difference permitted during winding performed when the reinforced layer is formed.

Due to the above-described cutting, the first side section 42 and parts or all of the first bottom section 40 and the third bottom section 64 are removed, whereby, as a result, the liner 10 shown in FIG. 1 is obtained. Note that when parts of the first bottom section 40 and the third bottom section 64 are left behind, it is preferable for a round section (fillet) to be formed on corner sections of the remaining first bottom section 40 and third bottom section 64. That is, the corner sections of the first bottom section 40 and the third bottom section 64 are preferably made curved. Moreover, some of the first side section 42 may be left behind.

In addition, a valve section is attached to the boss section 70 and then the reinforced layer covering the liner 10 and the valve section is provided, whereby the high pressure tank is manufactured. If, at this time, the residual projection amount of the first bottom section 40 and the third bottom section 64 does not exceed the previously described permitted level difference, then the stress acting from the remaining first bottom section 40 and third bottom section 64 on a fiber material (a carbon fiber, and so on) included in the reinforced layer does not exceed a permitted range. Moreover, if the corner sections of the remaining first bottom section 40 and third bottom section 64 are not curved, then there is concern that the fiber material (the carbon fiber, and so on) catches on the corners, thereby being locally extended and damaged, but when the round section is formed as described above, this concern is dispelled.

In the above way, a long high pressure tank is obtained. This high pressure tank is suitable as a hydrogen gas storage vessel in a fuel cell system installed in a large vehicle (a fuel cell vehicle) whose vehicle length is large, such as a truck or bus, for example. This is because it is possible for high pressure hydrogen gas to be stored in large quantities in the high pressure tank due to it being long, so even a large vehicle can have its travelable distance extended. Note that to install the high pressure tank in a general vehicle, the high pressure tank may be disposed in a so-called center tunnel, for example.

Since the members 20, 22, 56, 72 have excellent dimensional accuracy, concern that micro-pores due to a joining defect are formed in the joining region is dispelled. Moreover, since the first blocking member 56 and first trunk section configuring member 20, the first trunk section configuring member 20 and second trunk section configuring member 22, and the second trunk section configuring member 22 and second blocking member 72 are abutted on each other via flange sections, the area of the abutting surface increases. Since welding is performed in this state, sufficient joining strength is realized between the members. Hence, joining sections of the high pressure tank show sufficient pressure tightness with respect to a filling pressure. That is, a high pressure tank showing sufficient reliability is obtained.

Note that a configuration may be adopted where the second flange sections 38, 38 are removed to an extent that some of the second bottom sections 46, 46 of the annular projection 52*a* is left behind. Capacity in the high pressure tank increases proportionately. That is, stored matter such as the hydrogen gas can be stored in even larger quantities. Note that in this case, the left-behind second bottom sections 46, 46 become a projection projecting inwardly in the diametric direction.

Next, a high pressure tank according to a second embodiment will be described. Note that configuring elements the same as the configuring elements shown in FIGS. 1-6 will be assigned with the same reference symbols as those assigned in FIGS. 1-6, and detailed descriptions thereof will be omitted.

Figure 7:
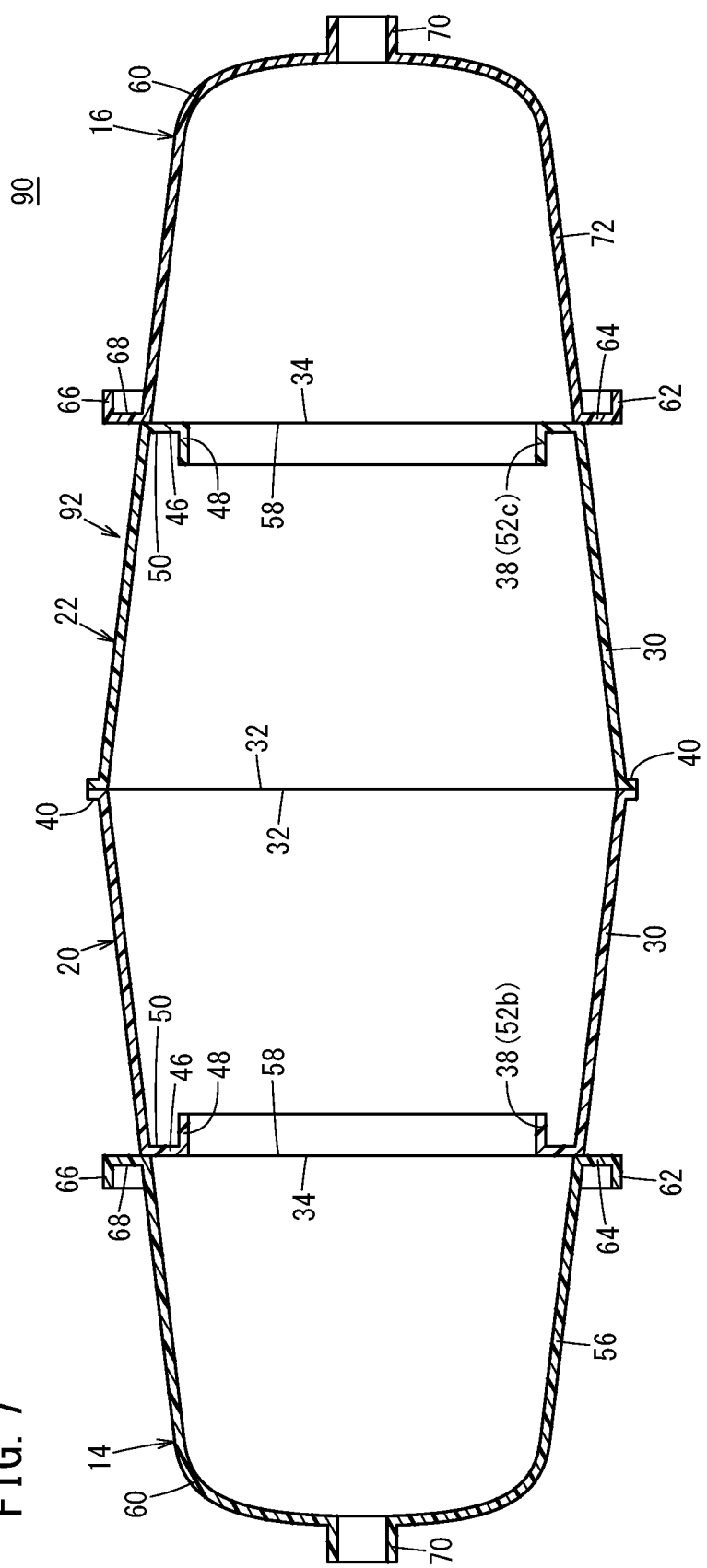
FIG. 7 is a schematic side cross-sectional view of a resin liner configuring a high pressure tank according to a second embodiment of the present invention.

FIG. 7 is a schematic side cross-sectional view of a liner 90 (a resin liner) configuring the high pressure tank according to the second embodiment. The liner 90 includes: a trunk section 92; and the first blocking section 14 and the second blocking section 16 that block both ends of the trunk section 92.

In the second embodiment, the first trunk section configuring member 20 and the second trunk section configuring member 22 are joined so that first flange sections 36, 36 (fellow first open ends 32, 32) of each of the first trunk section configuring member 20 and the second trunk section configuring member 22 face each other. Therefore, the trunk section 92 of the high pressure tank undergoes diameter reduction in a tapered manner toward the first blocking section 14 side and the second blocking section 16 side.

Annular projections 52*b*, 52*c* (projections) respectively project inwardly in the diametric direction in regions corresponding to a joining place of the first blocking member 56 and first trunk section configuring member 20 and a joining place of the second trunk section configuring member 22 and second blocking member 72, on an inner surface of the trunk section 92. The annular projections 52*b*, 52*c* are respectively configured by each of the second flange sections 38 of the first trunk section configuring member 20 and the second trunk section configuring member 22. Hence, the annular projection 52*b* adjacent to the first blocking section 14 includes: a bottom section configured from the second bottom section 46 of the first trunk section configuring member 20; and a first blocking section side peripheral wall section configured from the second side section 48 of the first trunk section configuring member 20 and extending toward the second blocking section 16. In the annular projection 52*b*, the second annular recess 50 as an annular recess is defined by the bottom section (the second bottom section 46 of the first trunk section configuring member 20) and the first blocking section side peripheral wall section (the second side section 48 of the first trunk section configuring member 20).

On the other hand, the annular projection 52*c* adjacent to the second blocking section 16 includes: a bottom section configured from the second bottom section 46 of the second trunk section configuring member 22; and a second blocking section side peripheral wall section configured by the second side section 48 of the second trunk section configuring member 22 and extending toward the first blocking section 14. In the annular projection 52*c*, the second annular recess 50 as another annular recess is defined by the bottom section (the second bottom section 46 of the second trunk section configuring member 22) and the second blocking section side peripheral wall section (the second side section 48 of the second trunk section configuring member 22).

Each of the second open ends 34 of the first trunk section configuring member 20 and the second trunk section configuring member 22 have the first blocking member 56 and the second blocking member 72 respectively joined thereto, and are thereby provided with the first blocking section 14 and the second blocking section 16. Note that although the third flange sections 62 of the first blocking member 56 and the second blocking member 72 are actually each removed in order to avoid being caught on by the reinforced layer when the reinforced layer is formed, FIG. 7 shows a state before removal so that a positional relationship of the third flange sections 62 can be more clearly understood.

Next, a method of manufacturing for manufacturing the high pressure tank by going through a process that obtains the liner 90 shown in FIG. 8 from the first trunk section configuring member 20, the second trunk section configuring member 22, the first blocking member 56, and the second blocking member 72, will be described.

First, the members 20, 22, 56, 72 are manufactured in a similar way to the first embodiment. In this case too, for similar reasons to those described above, mold costs can be lowered, and members 20, 22, 56, 72 having good dimensional accuracy can be obtained.

Figure 8:
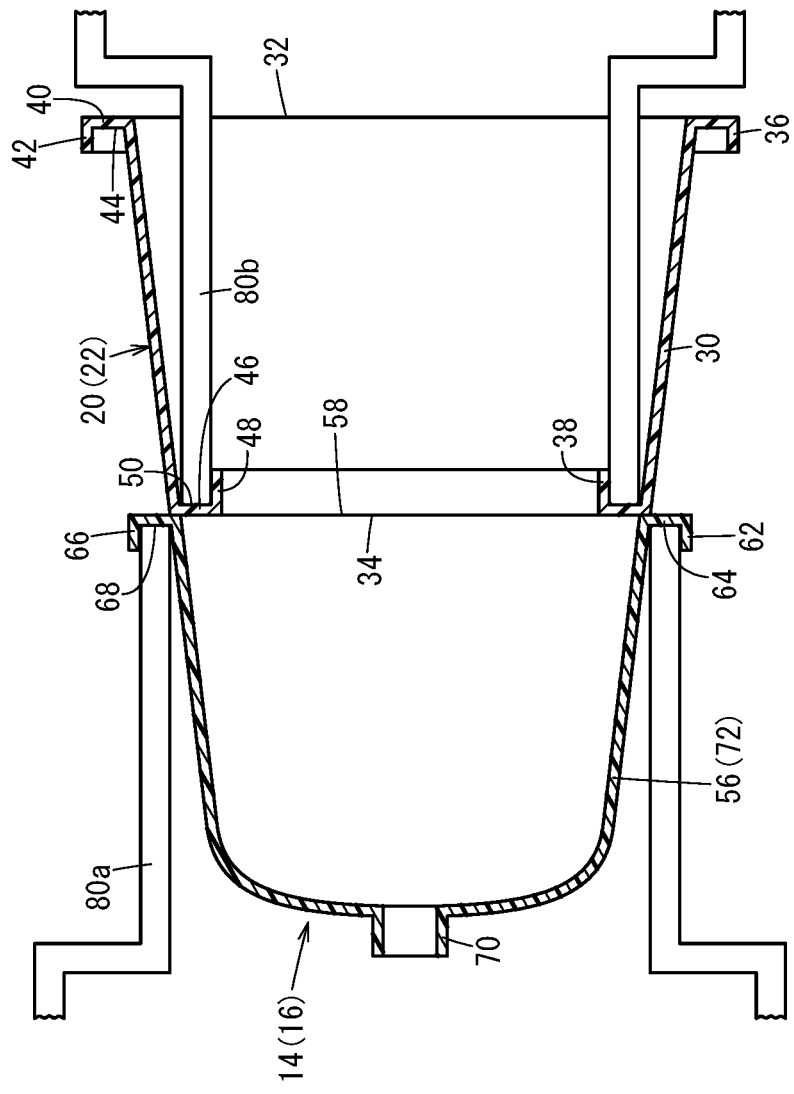
FIG. 8 is a schematic side cross-sectional view showing a state where a blocking member is joined to one of open ends of a liner configuring member.

Next, as shown in FIG. 8, the first blocking member 56 is joined to the first trunk section configuring member 20. At this time, the second open end 34 of the first trunk section configuring member 20 and the third open end 58 of the first blocking member 56 are faced on to each other so as to be separated by a certain distance. Then, the vibration welding-dedicated jig 80*a* is inserted in the third annular recess 68 of the first blocking member 56, while the vibration welding-dedicated jig 80*b* that has been advanced from the first open end 32 of the first trunk section configuring member 20 is inserted in the second annular recess 50 of the first trunk section configuring member 20.

Furthermore, the vibration welding-dedicated jigs 80*a*, 80*b* are displaced, and the third flange section 62 of the first blocking member 56 and the second flange section 38 of the first trunk section configuring member 20 are pressed in a direction of approaching each other. As a result, the third open end 58 of the first blocking member 56 and the second open end 34 of the first trunk section configuring member 20 abut on each other, whereby an abutting region is formed. At this time, the third flange section 62 projects more outwardly in the diametric direction than the first trunk section configuring member 20 does. Moreover, at least one of the vibration welding-dedicated jigs 80*a*, 80*b* is vibrated along the diametric direction of the first blocking member 56 or the first trunk section configuring member 20.

Due to frictional heat caused by this vibration, the abutting region softens or melts. After a certain time has elapsed, vibration imparting is stopped and the vibration welding-dedicated jigs 80*a*, 80*b* are displaced and respectively withdrawn from the third annular recess 68 and the second annular recess 50. In the first trunk section configuring member 20, the side wall (the inner wall) of the main body section 30 separates relatively from the second side section 48 as the side wall comes close to the first open end 32 side. The third side section 66 of the first blocking member 56 also similarly separates relatively from an outer wall of the first blocking member 56 as the third side section 66 comes close to a blocking end 60 side. It hence becomes easy for the vibration welding-dedicated jigs 80*a*, 80*b* to be withdrawn from the third annular recess 68 and the second annular recess 50.

Then, by the softened or melted resin material being cooled and thereby solidifying, the first blocking member 56 and the first trunk section configuring member 20 are joined, and the first blocking section 14 is obtained. The third flange section 62 of the first blocking member 56 is removed so that a residual projection amount thereof does not exceed a level difference permitted during winding performed when the reinforced layer is formed.

Next, similarly to in FIG. 8, the second blocking member 72 is joined to the second trunk section configuring member 22. That is, the second open end 34 of the second trunk section configuring member 22 and the third open end 58 of the second blocking member 72 are faced on to each other so as to be separated by a certain distance. Then, similarly to as described above, the vibration welding-dedicated jig 80*a* is inserted in the third annular recess 68 of the second blocking member 72 (or the second annular recess 50 of the first trunk section configuring member 20), while the vibration welding-dedicated jig 80*b* is inserted in the second annular recess 50 of the second trunk section configuring member 22 (or the third annular recess 68 of the second blocking member 72), after which vibration welding is performed. At this time, the third flange section 62 projects more outwardly in the diametric direction than the second trunk section configuring member 22 does.

After a certain time has elapsed, vibration imparting is stopped and the vibration welding-dedicated jigs 80*a*, 80*b* are displaced and respectively withdrawn from the second annular recess 50 and the third annular recess 68. For the above-described reasons, it is easy for the vibration welding-dedicated jigs 80*a*, 80*b* to be withdrawn from the second annular recess 50 and the third annular recess 68.

Then, by the softened or melted resin material being cooled and thereby solidifying, the second blocking member 72 and the second trunk section configuring member 22 are joined, and the second blocking section 16 is obtained. The third flange section 62 of the second blocking member 72 is removed so that a residual projection amount thereof does not exceed a level difference permitted during winding performed when the reinforced layer is formed.

Figure 9:
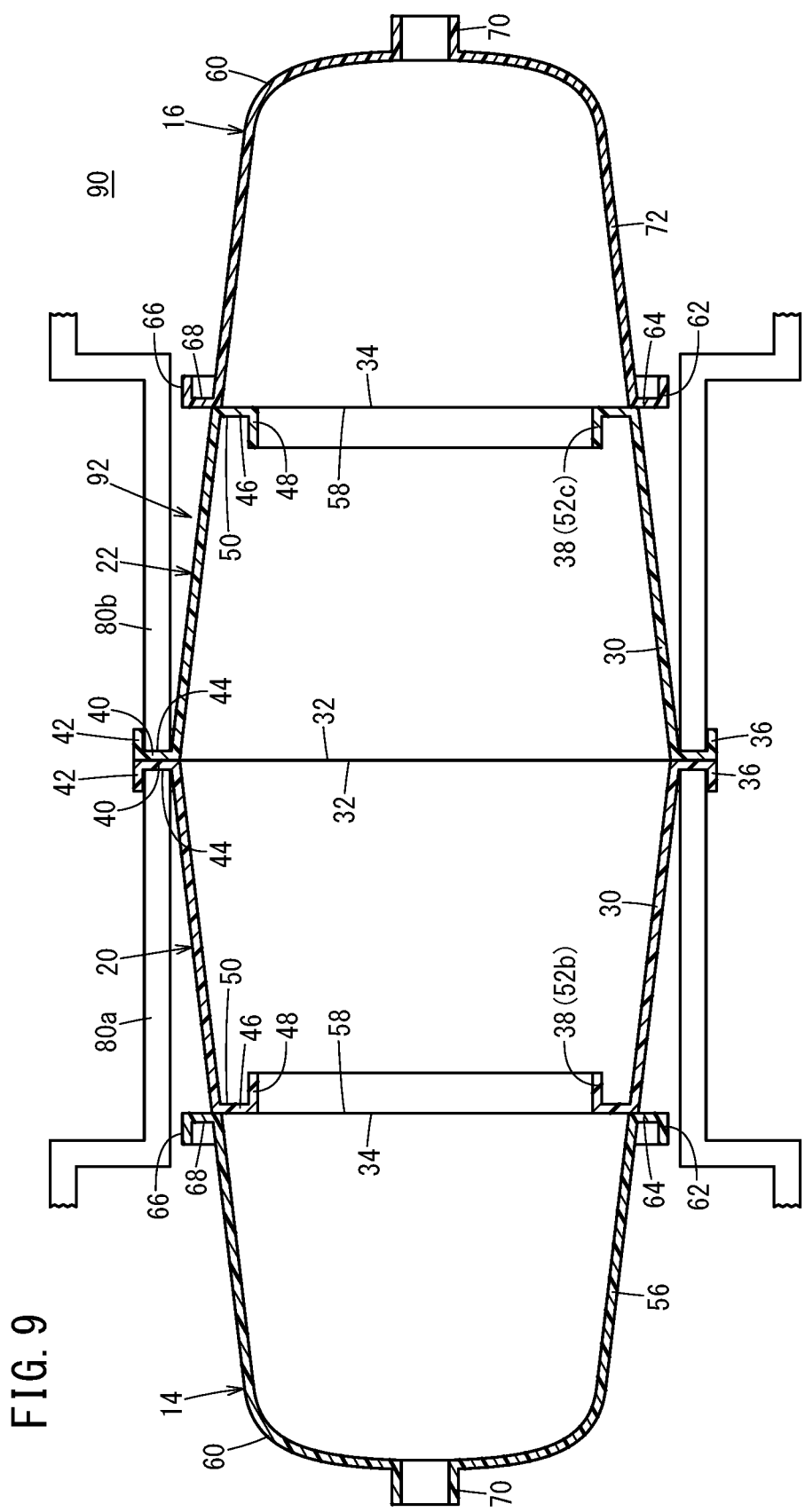
FIG. 9 is a schematic side cross-sectional view showing a state where fellow liner configuring members are joined, following FIG. 8.

Next, as shown in FIG. 9, the first trunk section configuring member 20 and the second trunk section configuring member 22 are joined. When vibration welding is performed, the first open end 32 of the first trunk section configuring member 20 and the first open end 32 of the second trunk section configuring member 22 are faced on to each other so as to be separated by a certain distance. Then, the vibration welding-dedicated jig 80*a* is inserted in the first annular recess 44 of the first trunk section configuring member 20. Similarly, the vibration welding-dedicated jig 80*b* is inserted in the first annular recess 44 of the second trunk section configuring member 22.

In this state, the vibration welding-dedicated jigs 80*a*, 80*b* are displaced whereby each of the first flange sections 36 of the first trunk section configuring member 20 and the second trunk section configuring member 22 are pressed in a direction of approaching each other. As a result, the first trunk section configuring member 20 and the second trunk section configuring member 22 approach each other, and first open ends 32, 32 abut on each other (are matched up). That is, the abutting step is performed, and an abutting region is formed.

Next, the vibration welding-dedicated jig 80*a* is vibrated along the diametric direction of the first trunk section configuring member 20, for example. Consequently, frictional heat occurs in the abutting region, and, as a result, the abutting region softens or melts. Since the vibration welding-dedicated jigs 80*a*, 80*b* in the first annular recesses 44 are pressing in a direction that the first trunk section configuring member 20 and the second trunk section configuring member 22 approach each other, the softened or melted resin material leaks out to an inner peripheral wall side or an outer peripheral wall side.

Note that a configuration may be adopted where the vibration welding-dedicated jig 80*b* is vibrated along the diametric direction of the second trunk section configuring member 22. Moreover, provided it is possible for the vibration welding-dedicated jigs 80*a*, 80*b* to be vibrated or rotated in a circumferential direction of the first trunk section configuring member 20 and the second trunk section configuring member 22, a configuration that does so may be adopted.

After a certain time has elapsed, vibration imparting is stopped and the vibration welding-dedicated jigs 80*a*, 80*b* are displaced and withdrawn from the first annular recesses 44. Since the side wall (the outer wall) of the main body section 30 separates relatively from the first side section 42 as the side wall comes close to the second open end 34 side, the vibration welding-dedicated jigs 80*a*, 80*b* can be easily withdrawn from the first annular recesses 44. Moreover, by the softened or melted resin material being cooled and thereby solidifying, the fellow first flange sections 36, 36 of the first trunk section configuring member 20 and the second trunk section configuring member 22 are joined.

Next, a cutting step in which the mutually-adhered first flange sections 36, 36 are cut, is performed. At this time, although a configuration may be adopted where all of the first flange sections 36 is removed, a configuration may be adopted where in order to increase an area of a joining surface of the first open ends 32, 32 and thereby obtain a large joining strength, some of the first bottom sections 40 is allowed to remain. In this case, the residual projection amount of the first bottom sections 40 is preferably set to not exceed a level difference permitted during winding performed when the reinforced layer is formed. Furthermore, it is preferable for chamfering to be performed on corner sections of the remaining first bottom sections 40, and for a round section to be formed in the corner sections.

On the other hand, the second flange sections 38 on the inner surface of the trunk section 92 are left behind. As a result, the annular projection 52*b* configured by the second flange section 38 of the first trunk section configuring member 20 and the annular projection 52*c* configured by the second flange section 38 of the second trunk section configuring member 22 each project inwardly in the diametric direction to become projections on the inner surface of the trunk section 92. The annular projection 52*b* is adjacent to the first blocking section 14, and the annular projection 52*c* is adjacent to the second blocking section 16.

As described above, the annular projection 52*b* includes: the bottom section configured from the second bottom section 46 of the first trunk section configuring member 20; and the first blocking section side peripheral wall section configured from the second side section 48 of the first trunk section configuring member 20 and extending toward the second blocking section 16, and the annular recess configured from the second annular recess 50 and defined by the bottom section and the first blocking section side peripheral wall section. Similarly, the annular projection 52*c* includes: the bottom section configured from the second bottom section 46 of the second trunk section configuring member 22; and the second blocking section side peripheral wall section configured from the second side section 48 of the second trunk section configuring member 22 and extending toward the first blocking section 14, and the other annular recess configured from the second annular recess 50 and defined by the bottom section and the second blocking section side peripheral wall section.

In the above way, the liner 90 is manufactured. In addition, a valve section is attached to the boss section 70 and then the reinforced layer covering the liner 90 and the valve section is provided, whereby the high pressure tank is manufactured. If, at this time, the residual projection amount of the first bottom sections 40 does not exceed the previously described permitted level difference, then the stress acting from the remaining first bottom sections 40 on the fiber material (the carbon fiber, and so on) included in the reinforced layer does not exceed a permitted range. Moreover, if the corner sections of the remaining first bottom sections 40 are round sections, then concern that the fiber material (the carbon fiber, and so on) is locally extended whereby the fiber material is damaged is dispelled.

As a result, a long high pressure tank is obtained. In this high pressure tank too, similar advantages to those described above are obtained.

In the second embodiment too, a configuration may be adopted where in order to increase the capacity in the high pressure tank, the second flange sections 38, 38 are removed to an extent that some of the second bottom section 46 of the annular projection 52b and the second bottom section 46 of the annular projection 52c is left behind. In this case, the left-behind second bottom sections 46, 46 become a projection projecting inwardly in the diametric direction.

The present invention is not specifically limited to the above-described embodiments, and may be variously modified in a range not departing from the spirit of the present invention.

For example, a configuration may be adopted where the first trunk section configuring member 20 and the second trunk section configuring member 22 are further connected on the same axis, and an even longer liner is obtained.

Figure 10:
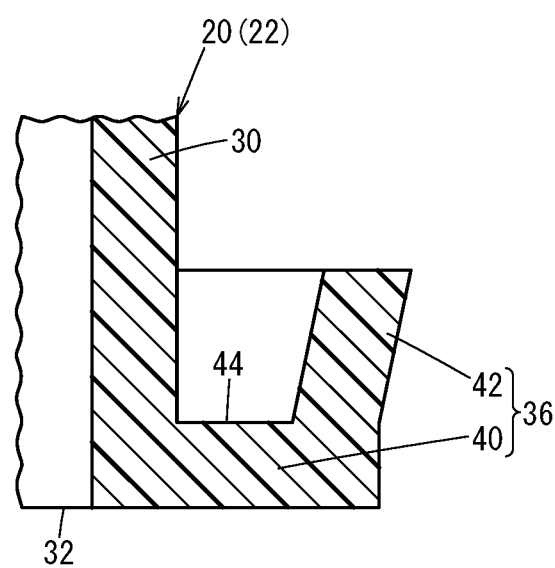

Moreover, the first trunk section configuring member 20 and the second trunk section configuring member 22 may be configured having their inner diameter and their outer diameter uniform. In this case, as shown in FIG. 10, each of the first side section 42 and the second side section 48 is preferably inclined so as to separate outwardly in the diametric direction as the first side section 42 and the second side section 48 extends far away from the first bottom section 40 and the second bottom section 46, respectively. It is also similarly preferable in the case of the first blocking member 56 and the second blocking member 72 that the third side sections 66 incline so as to separate outwardly in the diametric direction as the third side sections 66 extends far away from the third bottom sections 64. Note that FIG. 10 exemplifies an inclined first side section 42.

Furthermore, a configuration may be adopted where infrared heating welding is performed instead of vibration welding, or a configuration may be adopted combining vibration welding and infrared heating welding. When performing infrared heating welding, an infrared heating welding-dedicated tool should be inserted in the first annular recess 44, the second annular recess 50, and the third annular recess 68. Alternatively, a configuration may be adopted where hot plate welding is performed.

What is claimed is:

1. A liner configuring member that includes a main body section having a cylindrical shape which is configured from a resin material and whose both ends are opened to be formed as a first open end and a second open end, a plurality of the liner configuring members being connected on the same axis to configure a trunk section of a high pressure tank-dedicated liner,
there being included in a vicinity of the first open end a first flange section comprising: a first bottom section that projects outwardly in a radial direction; and a first side section that is continuous with the first bottom section and is spaced apart from the first open end, the first flange section providing a first annular recess is formed by the first bottom section and the first side section, and
there being included in a vicinity of the second open end a second flange section comprising: a second bottom section that projects inwardly in the radial direction; and a second side section that is continuous with the second bottom section and is spaced apart from the second open end, the second flange section providing a second annular recess is formed by the second bottom section and the second side section,
wherein the first annular recess is open toward the second open end and the second annular recess is open toward the first open end.

2. The liner configuring member according to claim 1, wherein the first side section inclines so as to separate to an outside in the radial direction relatively to the main body section as the first side section separates from the first bottom section, and the second side section inclines so as to separate to an inside in the radial direction relatively to the main body section as the second side section separates from the second bottom section.

3. The liner configuring member according to claim 2, wherein the main body section undergoes diameter reduction in a tapered manner in a direction from the first flange section to the second flange section.

4. A high pressure tank having a liner, the liner including: a trunk section configured from a resin material and having a cylindrical shape; and a first domed section and a second domed section, each of which is continuous with the trunk section at one end and is closed at another end,
wherein a single projection projecting inwardly in the radial direction is provided on an inner surface of the trunk section, and
the single projection is a single flange section that includes: a bottom section projecting inwardly in the radial direction; a first domed section side peripheral wall section continuous with the bottom section and extending toward the first domed section; and a second domed section side peripheral wall section continuous with the bottom section and extending toward the second domed section, and the projection has an annular recess formed therein by the bottom section and the first domed section side peripheral wall section, and has another annular recess formed therein by the bottom section and the second domed section side peripheral wall section, and
the annular recess is open toward the first domed section and the another annular recess is open toward the second domed section.

5. The high pressure tank according to claim 4, wherein the trunk section undergoes diameter expansion in a tapered manner as the trunk section approaches the first domed section and the second domed section.

6. The high pressure tank according to claim 4, wherein an inside of the high pressure tank is filled with high pressure hydrogen.

7. The high pressure tank according to claim 4, wherein the high pressure tank is installed in a fuel cell vehicle.

8. A method of manufacturing a high pressure tank, the high pressure tank having a liner, the liner including: a trunk section configured from a resin material and having a cylindrical shape; and a first domed section and a second domed section, each of which is continuous with the trunk section at one end and is closed at another end, the method of manufacturing the high pressure tank being:
when obtaining the trunk section by connecting on the same axis a plurality of liner configuring members each having both ends opened to be formed as a first open end and a second open end, using, as the liner configuring member, a member in which there is included in a vicinity of the first open end a first flange section comprising: a first bottom section that projects outwardly in a radial direction; and a first side section that is continuous with the first bottom section and is spaced apart from the first open end, the first flange section providing a first annular recess is formed by the first bottom section and the first side section, and there is included in a vicinity of the second open end a second flange section comprising: a second bottom section that projects inwardly in the radial direction; and a second side section that is continuous with the second bottom section and is spaced apart from the second open end, the second flange section providing a second annular recess is formed by the second bottom section and the second side section, and joining first bottom sections of the first flange sections, or second bottom sections of the second flange sections.

9. The method of manufacturing a high pressure tank according to claim 8, wherein the first bottom sections of the first flange sections or the second bottom sections of the second flange sections are joined by vibration welding, infrared heating welding, hot plate welding, or a combination of the vibration welding and the infrared heating welding.

10. The method of manufacturing a high pressure tank according to claim 8, wherein when the first bottom sections of the first flange sections are joined, all or part of at least the first side section is subsequently removed.

11. A high pressure tank having a liner, the liner including: a trunk section configured from a resin material and having a cylindrical shape; and a first blocking section and a second blocking section that are continuous with the trunk section and whose end sections are blocking ends, wherein two projections projecting inwardly in the radial direction are provided on an inner surface of the trunk section, and one of the two projections is a flange section that includes: a first bottom section projecting inwardly in the radial direction; a first blocking section side peripheral wall section continuous with the first bottom section and extending toward the first second blocking section, the other of the two projections is a flange section that includes: a second bottom section projecting inwardly in the radial direction; and a second blocking section side peripheral wall section continuous with the second bottom section and extending toward the first blocking section, the one of the two projections projection has an annular recess formed therein by the first bottom section and the first blocking section side peripheral wall section, and the other of the two projections has another annular recess formed therein by the second bottom section and the second blocking section side peripheral wall section, and the first annular recess is open toward the second blocking section and the second annular recess is open toward the first blocking section.

\* \* \* \* \*